United States Patent
Tang

(10) Patent No.: US 9,056,378 B2
(45) Date of Patent: Jun. 16, 2015

(54) MANUFACTURING MACHINE AND PRODUCTION LINE

(75) Inventor: Pei-Chong Tang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 528 days.

(21) Appl. No.: 13/430,785

(22) Filed: Mar. 27, 2012

(65) Prior Publication Data

US 2013/0017041 A1 Jan. 17, 2013

(30) Foreign Application Priority Data

Jul. 15, 2011 (CN) .......................... 2011 1 0198780

(51) Int. Cl.
| | |
|---|---|
| *B23Q 7/04* | (2006.01) |
| *B23Q 7/14* | (2006.01) |
| *B23Q 37/00* | (2006.01) |

(52) U.S. Cl.
CPC ........ *B23Q 7/046* (2013.01); *B23Q 7/04* (2013.01); *B23Q 7/1405* (2013.01); *B23Q 37/007* (2013.01)

(58) Field of Classification Search
CPC ......... B23P 21/00; B23P 21/002; B23Q 7/00; B23Q 7/03; B23Q 7/046; B23Q 7/048; B23Q 7/1405; B23Q 37/007; B65G 43/08; B65G 43/10; B65G 47/90; B65G 47/902; B65G 47/904; B65G 47/907
USPC .............. 198/339.1, 341.01, 341.08, 341.09, 198/346.2; 414/222.01, 222.03, 222.07, 414/222.08, 222.09, 222.11, 222.12, 414/222.13, 223.01
See application file for complete search history.

(56) References Cited

U.S. PATENT DOCUMENTS

| | | | | |
|---|---|---|---|---|
| 4,531,284 | A | * | 7/1985 | Matsuura et al. ................ 29/784 |
| 5,315,094 | A | * | 5/1994 | Lisy ............................... 235/385 |
| 7,051,863 | B2 | * | 5/2006 | Fujimura et al. .............. 198/575 |
| 7,552,529 | B2 | * | 6/2009 | Konrath et al. .................. 29/832 |
| 2011/0000063 | A1 | * | 1/2011 | Sueoka et al. .................. 29/33 P |

FOREIGN PATENT DOCUMENTS

| | | | | |
|---|---|---|---|---|
| CN | 2743622 | Y | 11/2005 | |
| CN | 201010360 | * | 1/2008 | ............ B65G 47/88 |
| CN | 201010360 | Y | 1/2008 | |
| JP | 02-224930 | A | 9/1990 | |
| TW | 200934626 | A | 8/2009 | |

* cited by examiner

*Primary Examiner* — Saul Rodriguez
*Assistant Examiner* — Brendan Tighe
(74) *Attorney, Agent, or Firm* — Novak Druce Connolly Bove + Quigg LLP

(57) ABSTRACT

A manufacturing machine for processing a product includes a frame, a processing device, an input conveyor belt, an output conveyor belt, two work-stations, two manipulators, and two work-stations. The processing device processes the product. The input conveyor belt transfers the product to the processing device. The output conveyor belt transfers the product after the product being processed. Two work-stations load the product. The two manipulators take the product from the input conveyor belt to the two work-stations, and take the product from the two work-stations to the output conveyor.

16 Claims, 6 Drawing Sheets

MANUFACTURING MACHINE AND PRODUCTION LINE

BACKGROUND

1. Technical Field

The present disclosure relates to manufacturing machines, and particularly to a production line formed by the manufacturing machines.

2. Description of Related Art

In surface mount technology (SMT) field, to implement auto-production, a plurality of devices for performing different functions are needed in a production line. However, the transfer of a product between two devices is a problem. One method to resolve that problem is to use a manipulator and a conveyor belt, which are added between the two devices and placed on one side of the production line, to transfer the product from one device to another device. However, such a method will increase the amount of real estate occupied by the complete production line.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Figure 1:
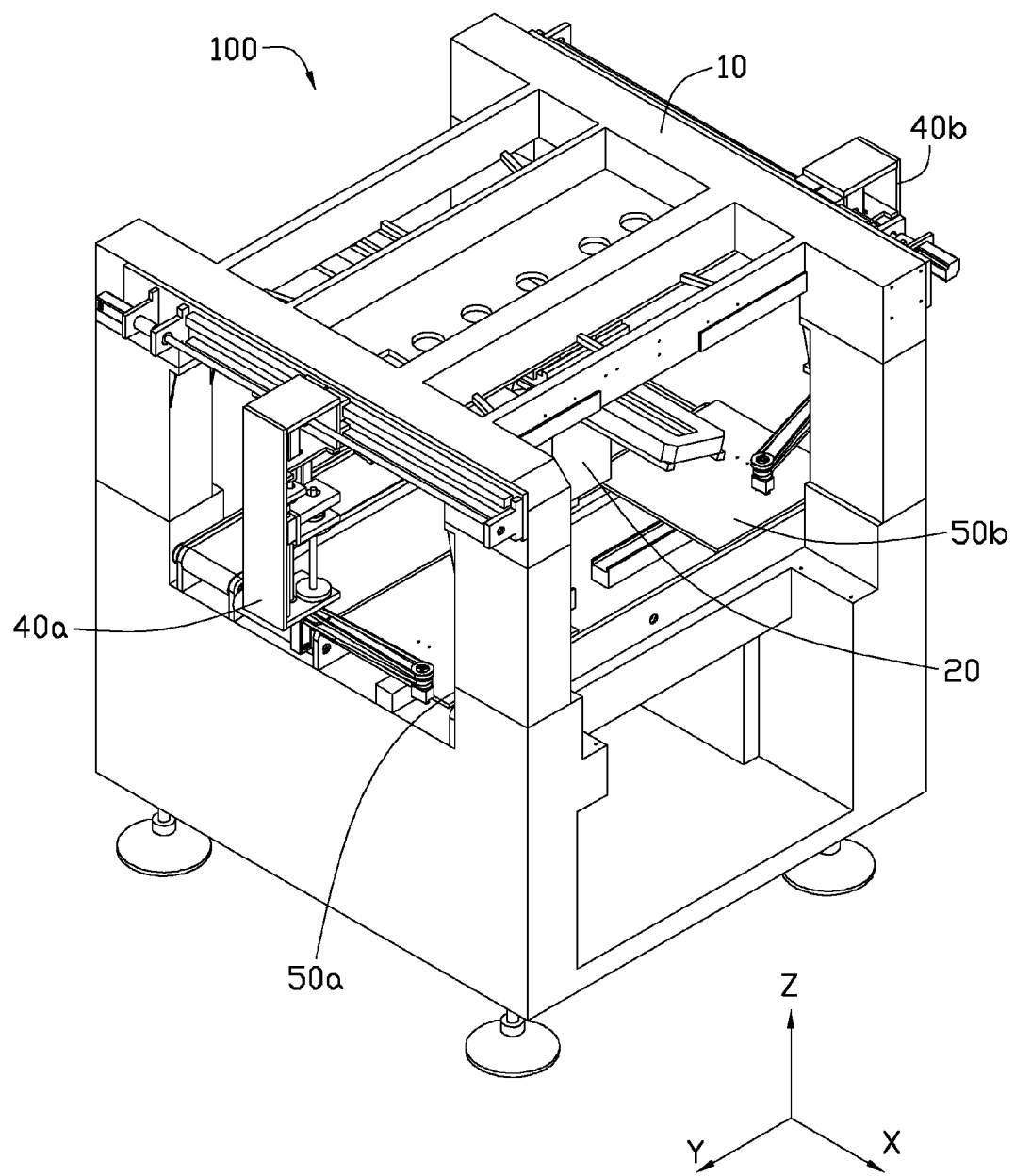
FIG. 1 is an isometric view of a machine for manufacturing, the manufacturing machine includes two work-stations and a processing device.
Figure 2:
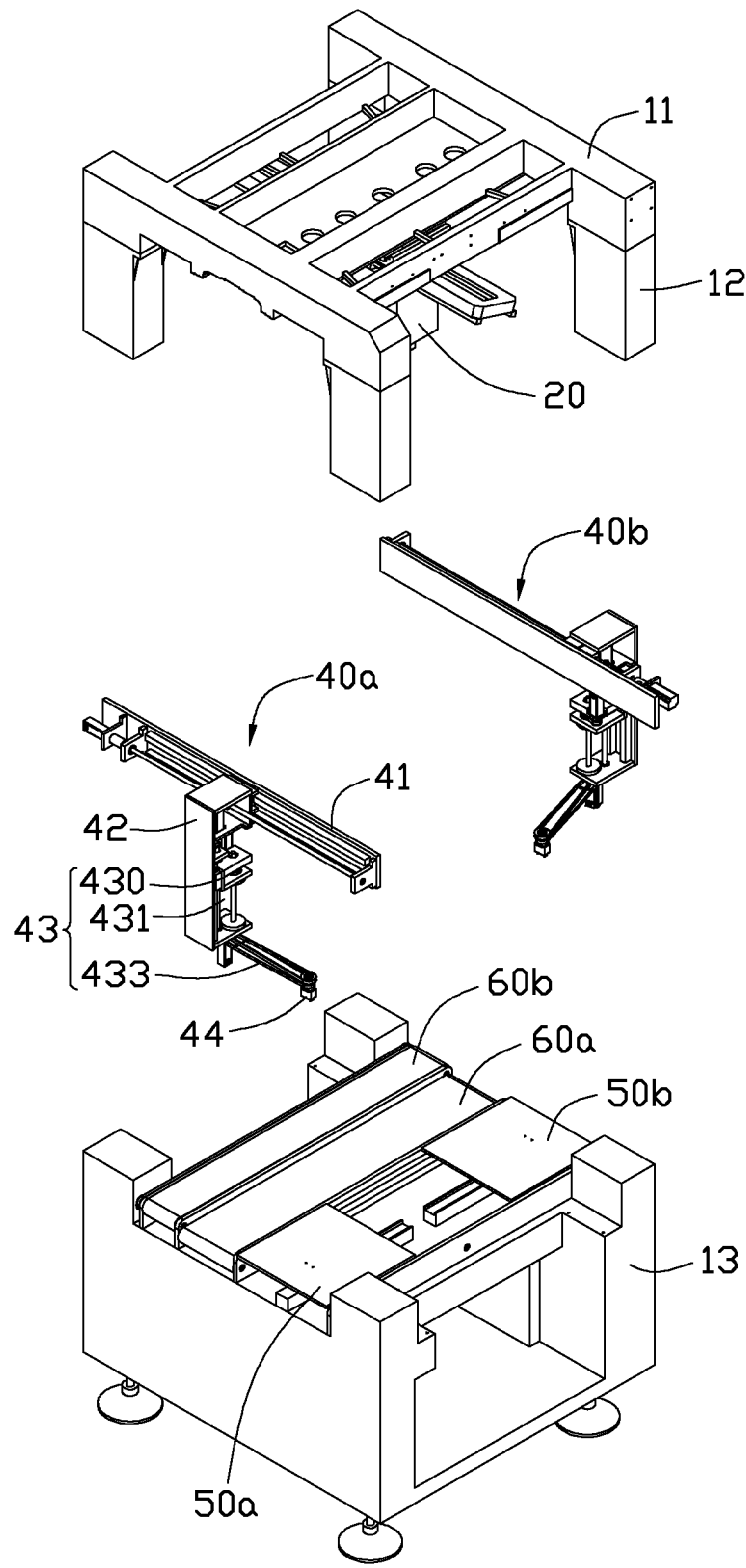
FIG. 2 is an exploded view of the manufacturing machine in FIG. 1.
Figure 3:
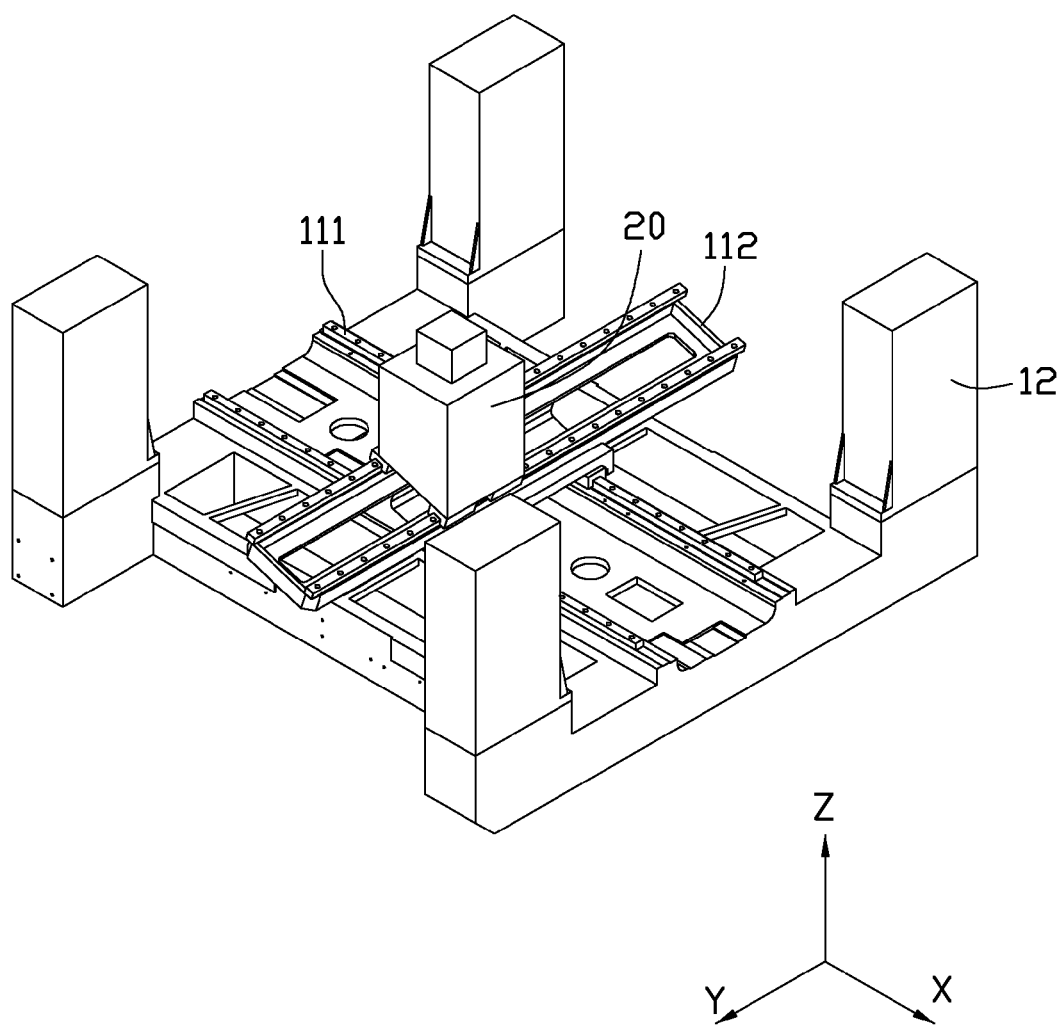
FIG. 3 is an isometric inverted view of the processing device of the manufacturing machine in FIG. 1.

Referring to FIGS. 1-3, the manufacturing machine 100 includes a frame 10 housing a processing device 20, a first manipulator 40a, a second manipulator 40b, a first work-station 50a, a second work-station 50b, an input conveyor belt 60a, and an output conveyor belt 60b. The input conveyor belt 60a is configured to transfer a product for processing. The first manipulator 40a and the second manipulator 40b are configured to fetch and transfer the product to the first work-station 50a and the second work-station 50b, respectively. The processing device 20 is configured to process the product placed on the first work-station 50a and the second work-station 50b. The first manipulator 40a and the second manipulator 40b are configured to fetch and transfer the processed products to the output conveyor belt 60b. The output conveyor belt 60b is configured to transfer the processed product away from the manufacturing machine 100.

The frame 10 includes a top body 11, a base body 13, and four holders 12. The top body 11 is attached to the base body 13 via the holder 12. The top body 11 sits on a first guiding rail 111, and a second guiding rail 112 is perpendicular to the first guiding rail 111. The first guiding rail 111 and the second guiding rail 112 are placed in an X-axis Y-axis plane which is horizontal. The first guiding rail 111 is placed along the X axis. The second guiding rail 112 is placed along the Y axis. The second guiding rail 112 is mounted to the first guiding rail 111, and capable of sliding along the first guiding rail 111.

The holder 12 is a column, positioned between the top body 11 and the base body 13 to support the top body 11, such that the top body 11 is capable of rising up from the base body 13. The holders 12 are placed at the edge of the base body 13. To adjust a distance between the top body 11 and the base body 13 along a Z axis which is perpendicular to the X-Y plane, each set of the columnar holders 12 is of different lengths and interchangable.

The processing device 20 is configured to detect and process the products. The processing device 20 is mounted to the second guiding rail 112 and faces the base body 13. The processing device 20 is capable of moving along the second guiding rail 112 and so moves along the Y axis. Further, the second guiding rail 112 can be moved along the X axis, taking the processing device 20 with it. Moreover, the processing device 20 can also be moved along the Z axis by changing the height of the holders 12. As a result, the processing device 20 can be moved up and down, right and left, and front and back with respect to the base body 13.

The first manipulator 40a and the second manipulator 40b are placed on opposite sides of the top body 11. Each of the first manipulator 40a and the second manipulator 40b includes a first base 41, a second base 42, a swing arm 43, and a grasping member 44. The first base 41 is mounted to the top body 11 and is placed along the X axis. The second base 42 is mounted to the first base 41, and extends to the base body 13 along the Z axis. The second base 42 is capable of moving along the first base 41, in other words the second base 42 can move along the X axis.

The swing arm 43 includes a connecting member 430, a pivot 431, and a swing member 433. The connecting member 430 is mounted to the second base 42 and capable of moving along the second base 42. The pivot 431 is parallel to the second base 42. One end of the pivot 431 is rotatably assembled to the connecting member 430, the opposite end of the pivot 431 is secured to swing member 433. The swing member 433 is perpendicular to the pivot 431. The pivot 431 is capable of rotating 360 degrees with respect to the connecting member 430, such that the swing member 433 can be rotated from the exterior to the interior of the frame 10 and from the interior to the exterior of the frame 10. The grasping member 44 is a claw and secured to the end of the swing member 433. As a result, the swing arms 43 of the first manipulator 40a and the second manipulator 40b can move along the X axis and along the Z axis, and the grasping member 44 can rotate into the frame 10 and rotate out of the frame 10 to take and transfer the product into or out of the frame 10. Further, the swing arm 43 only occupies a small area and a small volume of activity.

Figure 4:
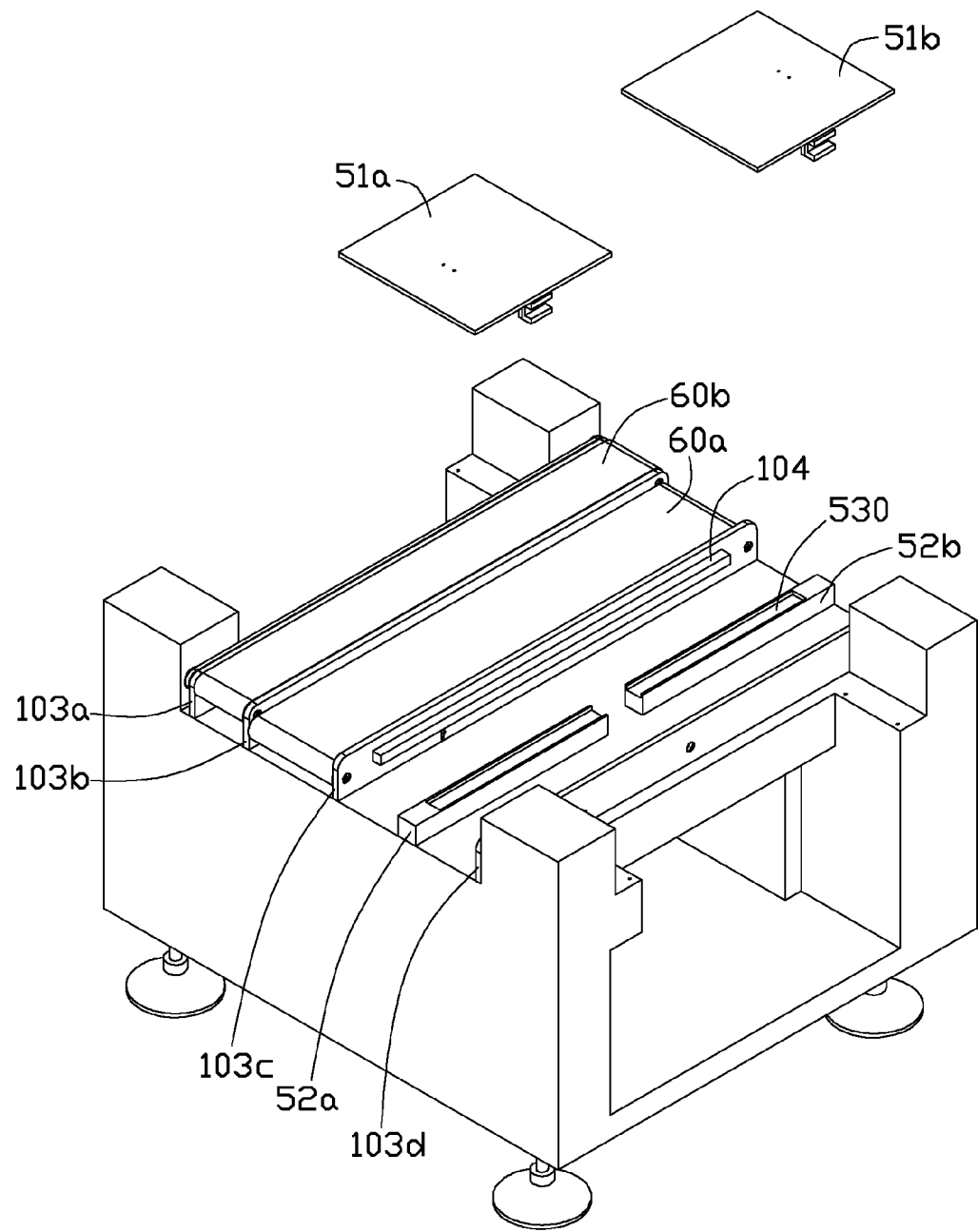
FIG. 4 is an exploded view of a part of the manufacturing machine in FIG. 1.

Referring to FIG. 4, the base body 13 includes a first supporting board 103a, a second supporting board 103b, a third supporting board 103c, and a fourth supporting board 103d. The first, second, third and fourth supporting boards 103a, 103b, 103c and 103d are placed in order along the X axis at intervals, and parallel to each other on a flat surface of the base body 13 facing to the top body 11. The spacing between each two supporting boards is different. For example, the spacing between the first supporting board 103a and the second supporting board 103b is the smallest, the spacing between the third supporting board 103c and the fourth 103d are the largest. Two third guiding rails 104 are set on the third supporting board 103c and the fourth supporting board 103d respectively, and the two third guiding rails 104 face each other. The two third guiding rails 104 are linear rails.

The output conveyor belt 60b is supported between the first supporting board 103a and the second supporting board 103b. The input conveyor belt 60a is supported between the second supporting board 103b and the third supporting board 103c. The input conveyor belt 60a is wider than the output conveyor belt 60b. The input conveyor belt 60a has a lower speed of operation than that of the output conveyor belt 60b. For example, the speed of the input conveyor belt 60a is between 20 and 25 percent of the speed of the output conveyor belt 60b. Such that the first manipulator 40a and the second manipulator 40b can take the product from the input conveyor belt 60a with little risk of error, and the output conveyor belt 60b can quickly transfer the processed product, such as from a current work-station to a next work-station.

Figure 5:
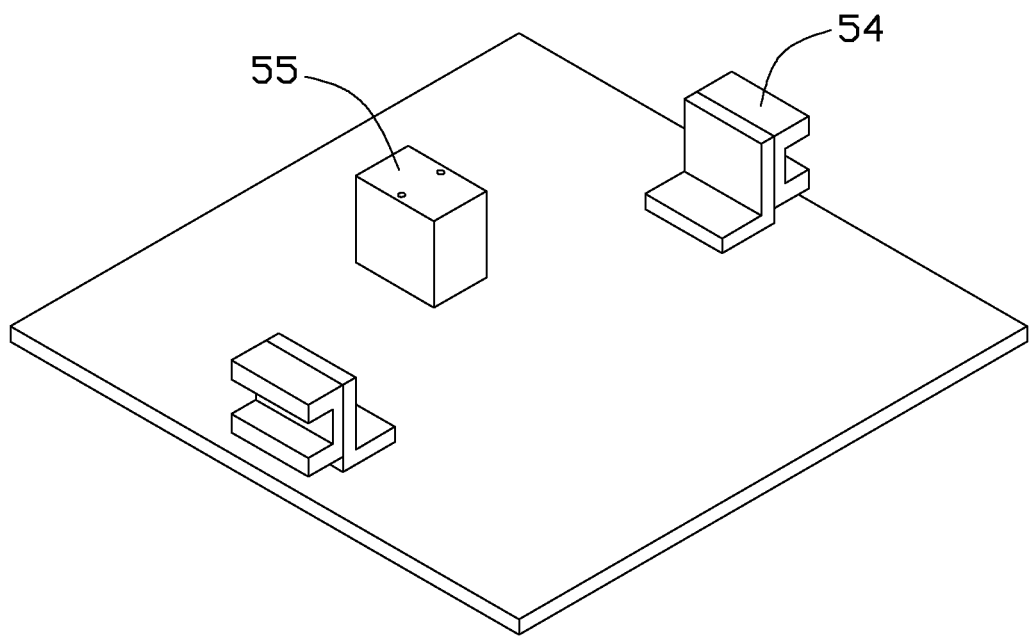
FIG. 5 an inverted view of a part of the work-stations of the manufacturing machine in FIG. 4.

Referring also to FIG. 5, the first work-station 50a and the second work-station 50b are supported between the third supporting board 103c and the fourth supporting board 103d at intervals. The first work-station 50a includes a first loader 51a, and a first motorized stage 52a. The second work-station 50b includes a second holder 51b, and a second motorized stage 52b. The first and the second loaders 51a and 51b are used for loading the products. The first and the second motorized stages 52a and 52b drive the first and the second loaders 51a and 51b to move.

The first and the second motorized stages 52a and 52b are positioned on the base body 13, and between the third supporting board 103c and the fourth supporting board 103d. Each of the first and the second motorized stages 52a and 52b defines a guiding groove 53 in a straight line along the Y axis, and provides a driving force to drive the first and the second loader 51a and 51b to move. Two original places are defined on the first and the second motorized stages 52a and 52b. One of the two original places is positioned on one end of the guiding groove 53 of the first motorized stage 52a away from the second motorized stage 52b. The other one of the two original places is positioned on one end of the guiding groove 53 of the second motorized stage 52b away from the first motorized stage 52a. A working place is defined between the first and the second motorized stages 52a and 52b.

Each side on the underside of the first loader 51a and the second loader 52b is a clasping member 54, and the middle of the underside of each loader 51a and loader 52b is a sliding block 55. The two clasping members 54 engage the two guiding rails 104, such that the two opposite sides of the first loader 51a and the second loader 51b are supported by the two guiding rails 104, and can move along the two guiding rails 104. The sliding block 55 engages the guiding groove 53 and can move along the guiding groove 53. Each sliding block 55 is the movable element in relation to the first loader 51a and to the second loader 51b, as each of the first loader 51a and the second loader 51b is moved along the first and the third guiding rails 104 when a driving force is exerted on the sliding block 55. For example, the first loader 51a is driven by the first motorized stage 52a to move to and from the original place and the working place. The second loader 51b is driven by the second motorized stage 52b to move to and from the original place and the working place.

The processing device 20 processes the product when the first loader 51a or the second loader 51b is positioned on the working place. The first and the second manipulators 40a, 40b take the processed products from the conveyor belt 60a to the first and second loaders 51a, 51b for loading, or take the processed products from the first loader and second loader 51a, 51b to the output conveyor belt 60b for unloading. The manner of operation of the manufacturing machine 100 is described below.

For example, a working order may be that the first work-station 50a should work first and then the second work-station 50b should work second. Firstly, the first manipulator 40a takes a product for processing from the input conveyor belt 60a to the first loader 51a for loading the product when the first loader 51a is located at the original place. Secondly, the processing device 20 processes the product when the first loader 51a moves to the working place. Thirdly, the first manipulator 40a takes the processed product from the first loader 51a to the output conveyor belt 60b for unloading the processed product, after which the first loader 51a moves back to the original place again. At the same time, the second manipulator 40b takes another product for processing from the input conveyor belt 60a to the second loader 51b for loading the product when the first loader 51a moves to the working place. The second loader 51b moves to the working place and the processing device 20 processes the product when the first loader 51a moves to the original place. The first loader 51a moves to the original place for loading the product and unloading the processed product during the processing device 20 processing the product on the second loader 51b. The first loader 51a moves to the working place again when the processing device 20 has processed the product on the second loader 51b.

In this embodiment, the amount of time that the first work-station 50a or the second work-station 50b spend in moving from original place to the working place is the same as the amount of time taken by the processing device 20 to process the product. Therefore, the first work-station 50a and the second work-station 50b loading the product alternately move to the working place to enable the product to be processed by the processing device 20. The first manipulator 40a and the second manipulator 40b are loading the product or unloading the product while the processing device 20 is working. As a result, the processing device 20 can continue working without waiting for more products, and the working efficiency of the manufacturing machine 100 is greatly improved.

Figure 6:
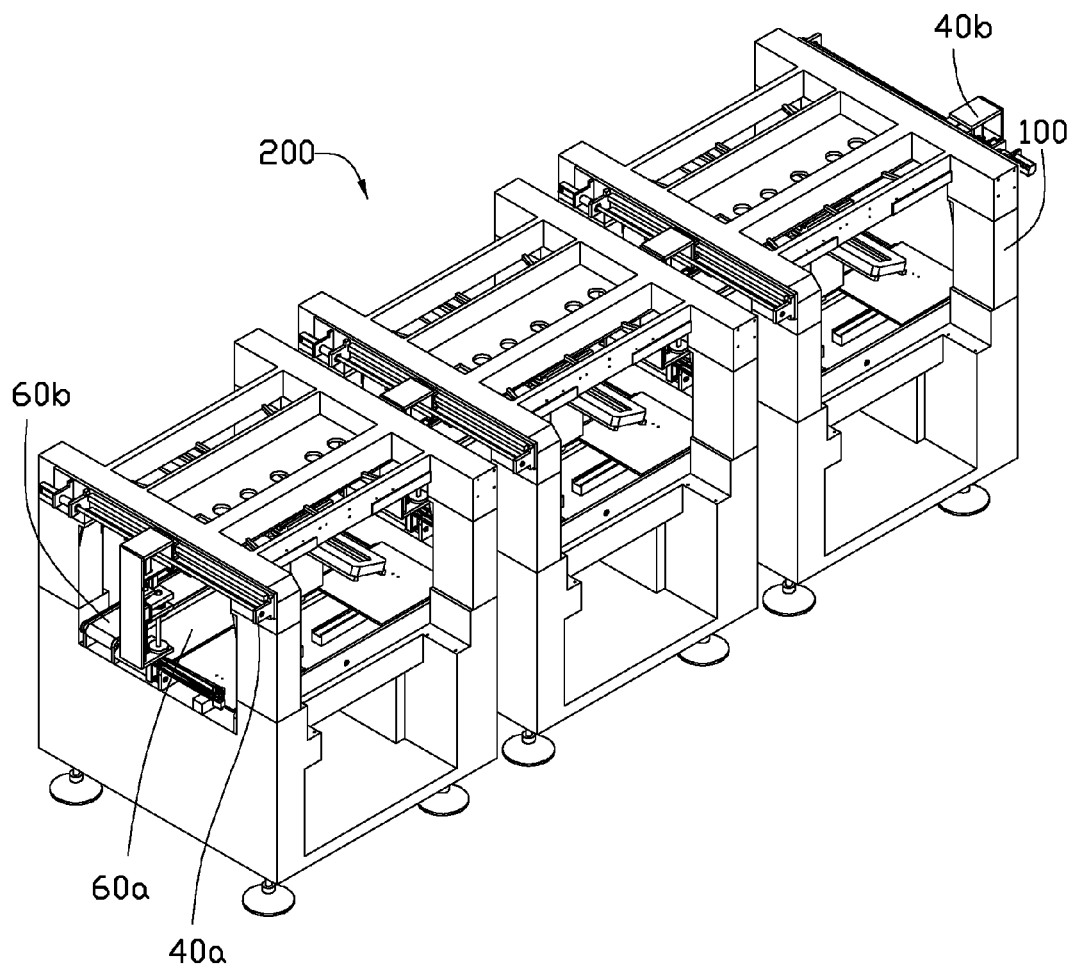
FIG. 6 is an isometric view of a production line.

FIG. 6 shows a production line 200 composed of a plurality of manufacturing machines 100. In this embodiment, the production line 200 includes three manufacturing machines 100. The three manufacturing machines 100 are arranged in sequence with the input conveyor belts 60a working together along the transferring direction, and the output conveyor belts 60b working together along the transferring direction. There is only one of the first manipulator 40a and only one of the second manipulator 40b positioned between the two manufacturing machines 100. In other words, two manufacturing machines 100 positioned on two ends of the production lines 200 both have the first manipulator 40a and the second manipulator 40b, the other manufacturing machines 100 only has one of the first manipulator 40a and the second manipulator 40b. It is to be recognized that if the number of the manufacturing machines 100 is N, the number of the manipulators is N+1.

It is to be understood, however, that even though relevant information and the advantages of the present embodiments have been set forth in the foregoing description, together with details of the functions of the present embodiments, the disclosure is illustrative only; and changes may be made in detail, especially in the matters of shape, size, and arrangement of parts within the principles of the present embodiments to the full extent indicated by the broad general meaning of the terms in which the appended claims are expressed.

What is claimed is:

1. A manufacturing machine for processing a product, comprising:
   a frame;
   a processing device for processing the product;
   an input conveyor belt for transfering the product to the processing device;
   an output conveyor belt for transfering the product after the product being processed;
   two work-stations for loading the product; and
   two manipulators for taking the product from the input conveyor belt to the two work-stations, and taking the product from the two work-stations to the output conveyor;
   wherein the processing device, the input conveyor belt, the output conveyor belt, the two work-stations, and the manipulators are positioned on the frame, the frame defines a working place, and two original places corresponding to two working stations respectively, each of the work-stations makes a round trip between the corresponding original place and the working place in a straight line; the manipulator takes the product from the input conveyor belt to be placed on the corresponding work-station for loading the product, the work-station loaded the product makes a round trip in a straight line between the corresponding original place and the corresponding working place, the manipulator further takes the processed product from the work-station to be placed on the output conveyor belt when the work-state returns to the original place; the processing device processes the product at the working place; the straight lines corresponding to different work-stations are separated from each other.

2. The manufacturing machine of claim 1, wherein the two work-stations are on the work place alternately.

3. The manufacturing machine of claim 1, wherein the amount of time that one of the work-stations being on the corresponding original place to being on the work place is the same as the amount of time taken by the processing device to process the product.

4. The manufacturing machine of claim 1, wherein the work-stations begin to move from the original places to the working place after the work-stations load the product.

5. The manufacturing machine of claim 1, wherein one of the work stations begins to move from the working place to the corresponding original place after the product on the one work station has processed.

6. The manufacturing machine of claim 1, wherein the input conveyor belt, the output conveyor belt, the two work-stations are positioned on an X-Y plane of the frame, the two manipulators along a Z axis perpendicular to the X-Y plane, and capable of rotating 360 degrees.

7. The manufacturing machine of claim 6, wherein the processing device is positioned above the X-Y plane, the processing device is capable of moving in the X-Y plane, and moving along the Z axis.

8. The manufacturing machine of claim 1, wherein the input conveyor belt has a lower speed of operation than that of the output conveyor belt.

9. The manufacturing machine of claim 8, wherein the speed of the input conveyor belt is between 20 and 25 percent of the speed of the output conveyor belt.

10. A production line for processing a product comprising:
    a plurality of manufacture machines each of the manufacturing machines comprising:
    a frame;
    a processing device for processing the product;
    an input conveyor belt for transfering the product to the processing device;
    an output conveyor belt for transfering the product after the product being processed; and
    two work-stations for loading the product;
    wherein two of the plurality of manufacturing machines positioned on two ends of the production line comprise two manipulators mounted to the frame, and other of the plurality of manufacturing machines comprise one manipulator mounted to the frame, the processing device, the input conveyor belt, the output conveyor belt, and the two work-stations are positioned on the corresponding frame, the frame defines a working place, and two original places corresponding to the two work-stations respectively, each of the work-stations makes a round trip between the corresponding original place and the working place in a straight line; each of the work-stations loads and unload the same product at the same original place; the manipulators take the product to the two work-stations respectively to load the product when the work-stations are located on the corresponding original places, the processing device begins to process the product when one of the two work stations is on the working place, the one work-station moves to the original place for unloading the product by the manipulators when the product has been processed by the processing device; the straight lines corresponding to the different work-stations are separated from each other.

11. The production line of claim 10, wherein the two work-stations are on the work place alternately.

12. The production line of claim 10, wherein the amount of time that one of the work-station spends for being on the corresponding original place to being on the work place is the same as the amount of time taken by the processing device to process the product.

13. The production line of claim 10, wherein the work-stations begin to move from the original places to the working place after the work-stations load the product.

14. The production line of claim 10, wherein the work stations begin to move from the working place to the original place after the product has been processed.

15. The production line of claim 10, wherein the input conveyor belt, the output conveyor belt, and the work-stations are positioned on an X-Y plane of the frame, the manipulators are positioned above the X-Y plane, and the manipulators are capable of moving along a Z axis perpendicular to the X-Y plane, and capable of rotating 360 degrees.

16. The production line of claim 15, wherein the processing device is positioned above the X-Y plane, the processing device is capable of moving in the X-Y plane, and moving along the Z axis.

* * * * *